United States Patent [19]
Wilson et al.

[11] Patent Number: 5,207,062
[45] Date of Patent: May 4, 1993

[54] CENTER VALVE MASTER CYLINDER WITH ADJUSTABLE CAGED PRIMARY SPRING

[75] Inventors: Robert K. Wilson; Donald A. Crumb, both of Granger, Ind.

[73] Assignee: Allied-Signal Inc., Morristown, N.J.

[21] Appl. No.: 920,965

[22] Filed: Jul. 28, 1992

[51] Int. Cl.[5] .......................... B60T 11/20; F15B 7/08
[52] U.S. Cl. ........................... 60/562; 60/589; 92/13
[58] Field of Search ............... 60/547.1, 562, 585, 60/588, 589; 92/13, 13.8

[56] References Cited

U.S. PATENT DOCUMENTS

| | | | |
|---|---|---|---|
| 3,167,920 | 2/1965 | Fleury | 92/13 |
| 3,487,641 | 1/1970 | Hackett | 60/589 |
| 3,972,192 | 8/1976 | Muterel | 60/562 |
| 4,078,384 | 3/1978 | Shutt | 60/562 X |
| 4,472,942 | 9/1984 | Nomura et al. | 60/562 |
| 4,534,170 | 8/1985 | Meynier | 60/547.1 |
| 4,550,567 | 11/1985 | Schaefer | 60/562 |
| 4,621,498 | 11/1986 | Schaefer | 60/562 |
| 4,858,437 | 8/1989 | Ochiai | 60/562 |
| 4,891,945 | 1/1990 | Becker | 60/547.1 |
| 4,922,120 | 5/1990 | Becker et al. | 303/114 |
| 4,939,901 | 7/1990 | Saalbach et al. | 60/562 |
| 5,036,751 | 8/1991 | Seip et al. | 92/13.4 |
| 5,040,768 | 8/1991 | Minami et al. | 92/13 X |
| 5,042,254 | 8/1991 | Schonlau et al. | 60/562 |
| 5,046,316 | 9/1991 | Steffes et al. | 60/562 |
| 5,050,382 | 9/1991 | Burgdorf et al. | 60/589 |
| 5,052,182 | 10/1991 | Nishii et al. | 60/547.1 |
| 5,056,313 | 10/1991 | Venetos et al. | 60/562 |
| 5,065,580 | 11/1991 | Nishii | 60/547.1 |
| 5,161,376 | 11/1992 | Hartmann | 60/589 X |

Primary Examiner—Edward K. Look
Assistant Examiner—Hoang Nguyen
Attorney, Agent, or Firm—Larry J. Palguta; Ken C. Decker

[57] ABSTRACT

A center-compensation master cylinder (10) has first (20) and second (30) pistons with center-compensation valve members (27, 37). The pistons (20, 30) have diametrically extending slots (22, 32) at central axial portions thereof through which extend pin members (53, 54) to effect opening of the valve members (27, 37) when the pistons (20, 30) are in at-rest positions. A first spring (29) extends between a head (24) of the first piston (20) and the second piston (30), and a second spring (39) extends between an end (15) of the bore 0 (14) and the head (34) of the second piston (30). The first spring (29) is caged via a caging mechanism (60) ensuring that the first (20) and second (30) pistons will travel simultaneously when the center-compensation valve members (27,37) are closing. The caging mechanism (60) is adjustable to control accurately the location of the second piston (30) in an at-rest position. The caging mechanism comprises an end part (47) non-rotatably and axially coupled with longitudinal extensions (40) of the head (24) of the first piston (20), a member (65) adjustably coupled with a threaded end (47C) of the end part (47), and a head (66) of the member (65) abutting a cage end member (70) which seats at a back portion (31) of the second piston (30). The cage end member (70) is cup-shaped and includes a radially flared lip (74) providing a seat for one end of the first spring (29) while the other end of the first spring (29) is received at a diametral extension (28) of the first piston (20).

10 Claims, 2 Drawing Sheets

CENTER VALVE MASTER CYLINDER WITH ADJUSTABLE CAGED PRIMARY SPRING

The present invention relates generally to tandem master cylinders, and in particular to tandem master cylinders with center-compensation valve members.

Tandem master cylinders with center-compensation valve members have been provided previously such as in Schaefer U.S. Pat. No. 4,550,567. A center-compensation valve member may be a part of a caging mechanism for the respective spring. It is desirable to provide a caging mechanism for the primary spring and which does not affect the center-compensation valve mechanism of the primary piston. The caging mechanism should be adjustable so that the at-rest position of the second piston may be accurately determined and thus minimize the tolerances involved in effecting the closing of the center-compensation valve member of the second piston. Additionally, the caging mechanism for the primary spring should ensure that the first and second pistons travel simultaneously while the center-compensation valves are closing during actuation.

The present invention provides solutions to the above problems by providing a tandem master cylinder, comprising a housing having therein an axial bore, first and second pistons located within the bore and defining therewith respective first and second pressure chambers, each piston including a head part having a valve member located within a through opening of the head part, and a diametral opening, a pair of axially spaced-apart pins extending into said bore and received within the diametral openings of the respective first and second pistons, each valve member engaging a respective pin in a rest position of the respective piston so that the valve member is open and permits fluid flow through the respective through opening, a first spring extending between the head part of the first piston and a rear portion of said second piston, and a second spring extending between the head part of the second piston and end of said bore, the improvement comprising the first spring being maintained by a caging mechanism which controls the extension of the first spring such that the location of the second piston in an at-rest position is accurately controlled, the caging mechanism comprising the head part of the first piston having a pair of longitudinal extensions defining diametrically opposed circumferential slots communicating with a central opening located between the longitudinal extensions, the extensions having shoulders adjacent the central opening, an end part having a radially extending end with at least a pair of radially extending tang members extending therefrom, the tang members received within the respective slots and the radially extending end received within the central opening such that the end part is non-rotatably coupled with the head part of the first piston, radially extendable resilient means located within the central opening and located between the radially extending part and the shoulders of the longitudinal extensions to capture said end part within the central opening, the end part including a longitudinal opening receiving therein a longitudinally adjustable member having a radially enlarged member located exteriorly of the longitudinal opening, and a cage end member seated at a rear portion of said second piston and including an end opening communicating with an interior opening such that the radially enlarged member extends through the end opening and is received within the interior opening thereof, the radially enlarged member engaging said cage end member, the first spring being captured between the cage end member and the head part of the first piston, such that longitudinal adjustment of the longitudinally adjustable member relative to the end part adjusts the extension of said first spring and determines the at-rest position of the second piston.

One way of carrying out the invention is described in detail below with reference to the drawings which illustrate an embodiment in which.

Figure 1:
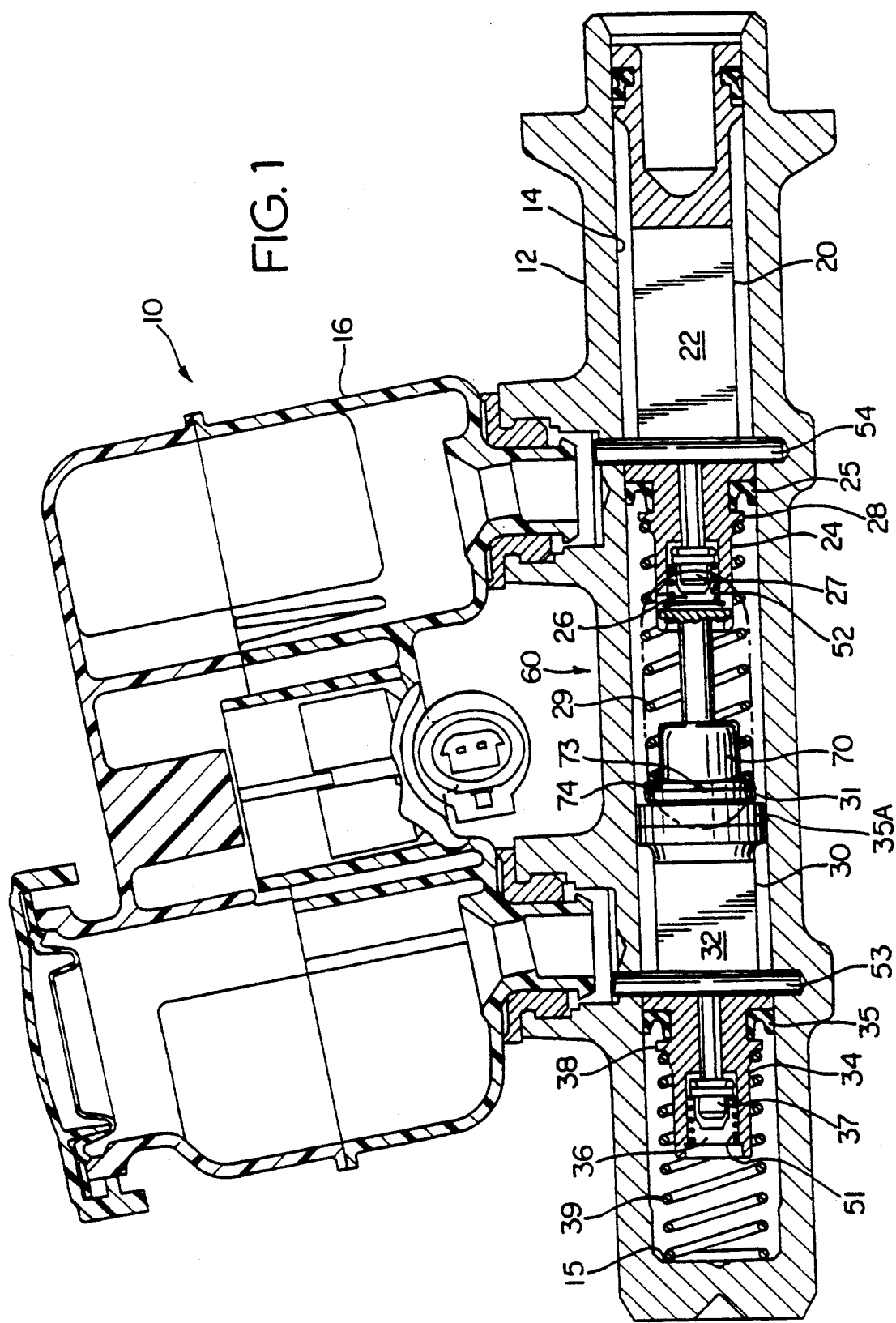
FIG. 1 is a section view of the tandem master cylinder of the present invention.

The master cylinder of the present invention is designated generally by reference numeral 10 in FIG. 1. Master cylinder 10 comprises body 12 having extended longitudinal or axial bore 14 which communicates fluidly with reservoir 16 by not shown compensation openings. Located within bore 14 is first piston 20 and second piston 30 having diametrically extending slot openings 22, 32 located at central axial portions. The pistons 20, 30 include head parts 24, 34 supporting lip seals 25, 35, 35A, and through openings 26, 36 receiving therein spring biased valve members 27, 37. Second piston 30 includes spring 51 biasing valve member 37 toward stop pin 53, while valve member 27 of first piston 20 is biased by spring 52 toward stop pin 54. First spring 29 is captured by a caging mechanism referenced generally by numeral 60, and second spring 39 is located between end 15 of bore 14 and shoulder 38 of head 34 of second piston 30.

Figure 2:
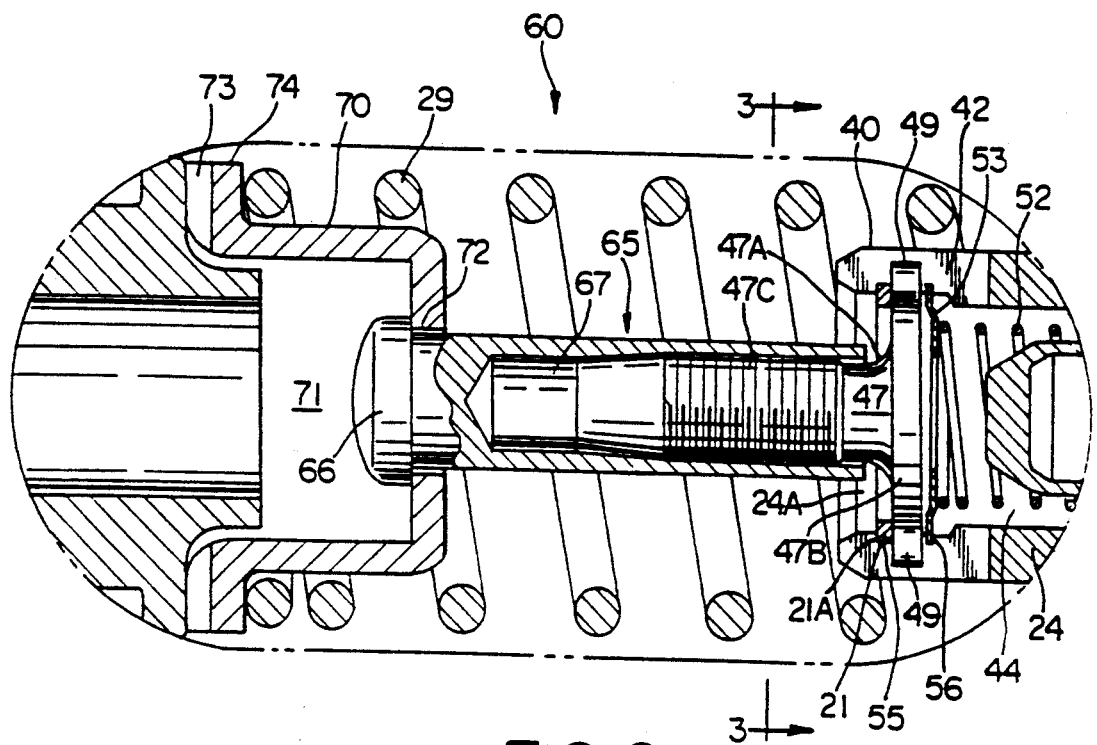
FIG. 2 is an enlarged section view of the encircled portion of FIG. 1.
Figure 3:
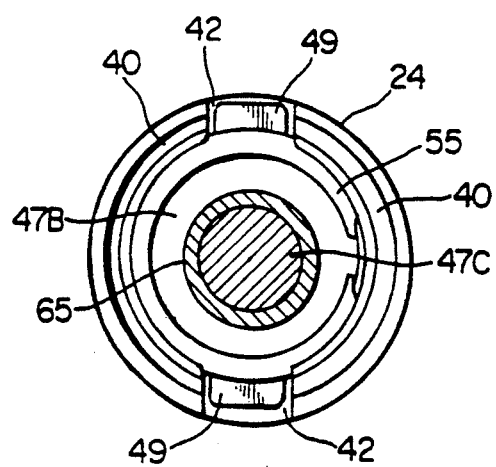
FIG. 3 is a partial end view taken along view line 3—3 of FIG. 2.

In FIG. 2, piston head 24 of first piston 20 includes a pair of longitudinal extensions 40 having therebetween a pair of oppositely disposed radial slots 42 communicating with central opening 44. End part 47 of caging mechanism 60 comprises longitudinal part 47A extending into radially extending end 47B located within central opening 44. Spring 52 biasing center-compensation valve member 27 seats on star washer 53 seated in groove 56 of extensions 40. End 47B includes a pair of oppositely extending tang members 49 which are received within slots 42 so that end part 47 is located non-rotatably relative to first piston head part 24. Radially extendable resilient means or flexible C-ring 55 is received within central opening 44 such that it is located in groove 21 against shoulders 21A of longitudinal extensions 40. End part 47 includes self tapping threaded end 47C received within longitudinally adjustable member 65. Member 65 includes radially enlarged member or head 66 and member opening 67 receiving the threads of end 47C. Caging mechanism 60 further includes cage end member 70 which is generally cup-shaped to define with second piston 30 an interior opening 71 communicating with end opening 72 receiving therein member 65. Cage end member 70 includes radially opposite lip openings 73 for fluid flow therethrough, and a flared flange or lip 74 providing a seat for one end of first spring 29 (see FIG. 1). The opposite end of first spring 29 seats at first piston diametral extension 28. Thus, caging mechanism 60 comprises end part 47 with radially extending end 47B coupled non-rotatably with axial longitudinal extensions 40 of first piston 0, and adjustable member 65 with its head 66 engaging cage end member 70 which is received at the back portion 31 of second piston 30.

Caging mechanism 60 is assembled by inserting end 47B within central opening 44 such that tang members 49 are received within the respective radial slots 42, and then inserting resilient means 55 through the smaller diameter end opening 24A of the first piston until it expands diametrically outwardly and is received within groove 21. First spring 29 is placed over head part 24 of first piston 20 until one end seats at diametral extension 28, and then cage end member 70 with member 65 is located at the other end of first spring 29 and member 65 screwed onto threaded end 47C. The member 65 is advanced along threaded end 47C until a predetermined spring load and length for first spring 29 is attained. The first piston with caging mechanism 60 engages second piston 30 and they are inserted into bore 14 of master cylinder body 12.

When the master cylinder is actuated for a braking application by a not shown rod effecting displacement of first piston 20 toward the left in FIG. I, first spring 29 effects a simultaneous movement of second piston 30 and as piston heads 24, 34 move away from respective pins 54, 53, respective valve members 27, 37 seat sealingly so that fluid no longer flows through respective openings 26, 36. When the braking application is completed, and the pistons return toward their respective at rest positions, the ends of valve members 27, 37 engage respective stop pins 54, 53 to cause valve members 27, 37 to move away from their respective seats in head parts 24, 34 and allow fluid flow through openings 26, 36. The caging mechanism for the primary spring enables the first spring to be set at a predetermined preload and a predetermined length which minimizes the tolerances involved in the closing of valve member 37 of second piston 30. The tolerances are minimized by adjusting member 65 such that the resulting at-rest position of the second piston is accurately controlled.

We claim:

1. A tandem master cylinder, comprising a housing having therein an axial bore, first and second pistons located within the bore and defining therewith respective first and second pressure chambers, each piston including a head part having a valve member located within a through opening of the head part, and a diametral opening, a pair of axially spaced-apart pins extending into said bore and received within the diametral openings of the respective first and second pistons, each valve member engaging a respective pin in a rest position of the respective piston so that the valve member is open and permits fluid flow through the respective through opening, a first spring extending between the head part of the first piston and a rear portion of said second piston, and a second spring extending between the head part of the second piston and end of said bore, the improvement comprising the first spring being maintained by a caging mechanism which controls the extension of the first spring such that the location of the second piston in an at-rest position is accurately controlled, the caging mechanism comprising the head part of the first piston having a pair of longitudinal extensions defining diametrically opposed circumferential slots communicating with a central opening located between the longitudinal extensions, the extensions having shoulders adjacent the central opening, an end part having a radially extending end with at least a pair of radially extending tang members extending therefrom, the tang members received within the respective slots and the radially extending end received within the central opening such that the end part is non-rotatably coupled with the head part of the first piston, radially extendable resilient means located within the central opening and located between the radially extending part and the shoulders of the longitudinal extensions to capture said end part within the central opening, the end part coupled with a longitudinally adjustable member having a radially enlarged member, and a cage end member seated at a rear portion of said second piston and including an end opening communicating with an interior opening such that the radially enlarged member extends through the end opening and is received within the interior opening thereof, the radially enlarged member engaging said cage end member, the first spring being captured between the cage end member and the head part of the first piston, such that longitudinal adjustment of the longitudinally adjustable member relative to the end part adjusts the extension of said first spring and determines the at-rest position of the second piston.

2. The master cylinder in accordance with claim 1, wherein the longitudinally adjustable member comprises a member having a member opening and a flared head comprising the radially enlarged member, and the longitudinal opening of the end part comprises a threaded end received within the member opening.

3. The master cylinder in accordance with claim 2, wherein the cage end member comprises a cup-shaped member having a radially outwardly flared lip engaging one end of the first spring.

4. The master cylinder in accordance with claim 3, wherein the valve member of the first piston includes a spring located between the valve member and a washer such that the valve member is biased toward the respective pin.

5. The master cylinder in accordance with claim 4, wherein the radially extendable resilient means comprises a resilient C-shaped ring which captures the radially extending end within the central opening.

6. In a tandem master cylinder having a pair of pistons with center compensation valves and a first piston of said pair having a through opening receiving therein a center compensation valve member biased by a spring, an improved process for locating accurately a second piston of said pair a predetermined distance from said first piston by means of a caging mechanism for a primary spring extending between said first and second pistons, the caging mechanism comprising at least one longitudinal extension of the first piston defining a slot communicating with a central opening located radially within the longitudinal extension, an end part extending within the central opening and having at least one tang member extending radially therefrom, radially extendable resilient means located within the central opening, a longitudinally adjustable member connected with said end part, and a cage end member engaging a rear portion of the second piston and engaging said longitudinally adjustable member, the process comprising the steps of:

inserting said end part within said central opening such that said one tang is captured within said slot, inserting said radially extendable resilient means within the central opening such that the resilient means expands upon entry into the central opening and retains said end part within said central opening, inserting the primary spring about said end part so that one end of the primary spring engages the first piston, placing said cage end member into alignment with said end part and connecting said longitudinally adjustable member with said end part, the other end of the primary spring being engaged by the cage end member, adjusting the longitudinally adjustable member to effect a predetermined primary spring load and length, and inserting the first piston, primary spring and caging mechanism into the bore of the master cylinder so that the cage end member engages and locates accurately the second piston.

7. The process in accordance with claim 6, wherein the cage end member includes an end opening which receives a radially enlarged member of the adjustable member.

8. The process in accordance with claim 7, wherein said longitudinally adjustable member comprises a member opening receiving a threaded end of the end part.

9. The process in accordance with claim 8, further comprising the step of inserting a pin orthogonally through the bore of the master cylinder after insertion of the caging mechanism and first piston and the first piston positioned in the bore by the pin.

10. The process in accordance with claim 9, wherein the center compensation valve member of the first piston abuts the pin when the first piston is in an at-rest position so that the center compensation valve member permits fluid flow through the first piston.

* * * * *